(12) United States Patent
Schubert et al.

(10) Patent No.: US 10,720,767 B2
(45) Date of Patent: Jul. 21, 2020

(54) MULTILAYER STRESS CONTROL ARTICLE AND DRY TERMINATION FOR MEDIUM AND HIGH VOLTAGE CABLE APPLICATIONS

(71) Applicant: 3M INNOVATIVE PROPERTIES COMPANY, St. Paul, MN (US)

(72) Inventors: Robert J. Schubert, Cedar Park, TX (US); Christopher J. Evoniuk, Austin, TX (US); Jens Weichold, Erkelenz (DE); Andrew C. Lottes, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/477,342

(22) PCT Filed: Jan. 25, 2018

(86) PCT No.: PCT/US2018/015141
§ 371 (c)(1),
(2) Date: Jul. 11, 2019

(87) PCT Pub. No.: WO2018/144300
PCT Pub. Date: Aug. 9, 2018

(65) Prior Publication Data
US 2019/0379198 A1    Dec. 12, 2019

Related U.S. Application Data

(60) Provisional application No. 62/452,570, filed on Jan. 31, 2017.

(51) Int. Cl.
*H02G 15/064* (2006.01)

(52) U.S. Cl.
CPC ................................ *H02G 15/064* (2013.01)

(58) Field of Classification Search
CPC combination set(s) only.
See application file for complete search history.

(56) References Cited

U.S. PATENT DOCUMENTS

| | | |
|---|---|---|
| 1,563,946 A | 12/1925 | Atkinson |
| 2,651,670 A | 9/1953 | Bosworth |
| | (Continued) | |

FOREIGN PATENT DOCUMENTS

| | | |
|---|---|---|
| CA | 2024165 A | 3/1991 |
| CA | 2051481 A1 | 9/1991 |
| | (Continued) | |

OTHER PUBLICATIONS

Buckley, et al., "The Sol-Gel Preparation of Silica Gels", *Journal of Chemical Education*, vol. 1, No. 7 (Jul. 1994); pp. 599-602.
(Continued)

*Primary Examiner* — Timothy J Thompson
*Assistant Examiner* — Krystal Robinson
(74) *Attorney, Agent, or Firm* — Gregg H. Rosenblatt

(57) ABSTRACT

A tubular stress control article having an axial bore with a length comprises a first and innermost layer formed from an electrical stress control composition having a filler material comprising nanosilica-modified inorganic particles and a discontinuous arrangement of conductive material dispersed in an elastomeric material. At least a portion of the conductive material is in durable electrical contact with the inorganic particles. The article further comprises a second layer disposed on the first layer, the second layer comprising an electrical insulation material. The article also comprises a third layer disposed on the second layer, the third layer comprising an elastomeric stress control material. The article further comprises a fourth layer disposed on the third layer, the fourth layer comprising a track-resistant elastomeric material. Each of the first, second, third, and fourth
(Continued)

layers are substantially continuous along the length of the axial bore.

17 Claims, 3 Drawing Sheets

(56) References Cited

U.S. PATENT DOCUMENTS

| | | | |
|---|---|---|---|
| 2,886,631 A * | 5/1959 | Muller | H01B 9/025 174/108 |
| 3,005,868 A | 10/1961 | Linderholm | |
| 3,538,235 A * | 11/1970 | Arendt | H01B 13/321 174/230 |
| 3,558,801 A * | 1/1971 | Eilhardt | H01B 3/307 174/102 R |
| 3,666,876 A | 5/1972 | Forster | |
| 3,790,697 A * | 2/1974 | Buckingham | H01B 9/02 174/102 R |
| 3,943,271 A * | 3/1976 | Bahder | H01B 7/2813 174/23 R |
| 4,083,796 A * | 4/1978 | Schubert | C11D 3/40 264/75 |
| 4,234,439 A | 11/1980 | Kehr et al. | |
| 4,360,704 A * | 11/1982 | Madry | H01B 9/02 174/36 |
| 4,363,842 A | 12/1982 | Nelson | |
| 4,403,109 A | 9/1983 | Lehrl et al. | |
| 4,435,613 A * | 3/1984 | Gaubert | H01B 7/285 174/102 SC |
| 4,470,898 A | 9/1984 | Penneck et al. | |
| 4,638,114 A * | 1/1987 | Mori | H01B 11/1839 174/108 |
| 4,703,132 A * | 10/1987 | Marciano-Agostinelli | H01B 7/288 174/23 C |
| 4,726,991 A | 2/1988 | Hyatt et al. | |
| 4,738,318 A | 4/1988 | Boettcher et al. | |
| 4,791,240 A * | 12/1988 | Marin | H01B 7/288 174/23 C |
| 5,010,209 A * | 4/1991 | Marciano-Agostinelli | H01B 7/2813 174/102 SC |
| 5,261,021 A * | 11/1993 | Pasta | G02B 6/4416 174/23 R |
| 6,251,513 B1 | 6/2001 | Rector et al. | |
| 6,268,054 B1 | 7/2001 | Costantino et al. | |
| 7,169,327 B2 | 1/2007 | Ito et al. | |
| 7,588,826 B2 | 9/2009 | Zaghib | |
| 7,618,550 B2 | 11/2009 | Greuter et al. | |
| 8,974,706 B2 | 3/2015 | Somasiri et al. | |
| 10,128,023 B2 * | 11/2018 | Olsen | H01B 7/045 |
| 10,153,069 B2 * | 12/2018 | Dalin | H01B 7/282 |
| 10,262,775 B2 * | 4/2019 | Doneker | H01B 1/04 |
| 10,354,780 B2 * | 7/2019 | Smith | H01B 9/0677 |
| 2004/0129449 A1 | 7/2004 | Boettcher et al. | |
| 2005/0218380 A1 | 10/2005 | Gramespacher | |
| 2006/0145119 A1 | 7/2006 | Onneby | |
| 2006/0167139 A1 * | 7/2006 | Nelson | B82Y 30/00 523/212 |
| 2006/0186384 A1 | 8/2006 | Gerhardt | |
| 2007/0000682 A1 * | 1/2007 | Varkey | H01B 7/046 174/102 R |
| 2007/0044991 A1 * | 3/2007 | Varkey | H01B 7/046 174/102 R |
| 2007/0117898 A1 | 5/2007 | Tan | |
| 2008/0006795 A1 | 1/2008 | Khatua et al. | |
| 2008/0006796 A1 | 1/2008 | Khatua et al. | |
| 2009/0242855 A1 | 10/2009 | Fleming et al. | |
| 2009/0309195 A1 | 12/2009 | Giraud | |
| 2016/0300645 A1 | 10/2016 | Yaworski | |
| 2017/0250008 A1 * | 8/2017 | Somasiri | C09J 7/00 |
| 2019/0237260 A1 * | 8/2019 | Stollwerck | G01R 15/06 |

FOREIGN PATENT DOCUMENTS

| | | | |
|---|---|---|---|
| CN | 101225245 A | 7/2008 | |
| CN | 101440180 A | 5/2009 | |
| CN | 201332254 Y | 10/2009 | |
| EP | 0 035 271 A1 | 9/1981 | |
| EP | 1 056 162 A2 | 11/2000 | |
| EP | 2 466 708 A1 | 6/2012 | |
| JP | 55-057426 A2 | 4/1980 | |
| JP | 55-099984 A1 | 7/1980 | |
| JP | 2005-016983 A | 1/2005 | |
| KR | 10-1223184 B1 | 1/2013 | |
| WO | WO 2000/074191 | 12/2000 | |
| WO | WO 2001/028055 | 4/2001 | |
| WO | WO-2016012918 A1 * | 1/2016 | H01R 4/68 |

OTHER PUBLICATIONS

Joubert, et al., "Polarization Behaviour of Multi-Layer Insulation Systems in Cable Accessories when Subjected to Voltages at Different Frequencies", *2014 ICHV International Conference on High Voltage Engineering and Application*, IEEE, Poznan, Poland (Sep. 8-11, 2014), 4 pp.

Joubert, et al., "Influence of heat-shrink joints and terminations on Tan δ values of a medium voltage cable installation at very low frequency", *9th International Conference on Insulated Power Cables*, Jicable'15—Versailles (Jun. 21-25, 2015), E5.1, 5 pp.

Kalyon, et al., "Electrical Properties of Composites as Affected by the Degree of Mixedness of the Conductive Filler in the Polymer Matrix", *Polymer Engineering and Science*, vol. 42, No. 7 (Jul. 2002); pp. 1609-1617.

Kuhner, et al., "Silikatnanopartikel als verstärkende Füllstoffe in Siliconen / Nano silicate particles as reinforcing fillers in silicones", *GAK Gummi Fasern Kunststoffe*, vol. 61, Issue 9 (Sep. 2008); pp. 557-560.

Moon, et al., "Dielectric Properties of Epoxy-Dielectrics-Carbon Black Composite for Phantom Materials at Radio Frequencies", *Journal of Applied Polymer Sciences*, VI. 77 (2000); pp. 1294-1302.

Moulart, et al., "Polymeric Composites for Use in Electronic and Microwave Devices", *Polymer Engineering and Science*, vol. 44, No. 3 (Mar. 2004); pp. 588-597.

Obrzut, et al., "High Frequency Loss Mechanism in Polymers Filled with Dielectric Modifiers", *Mat. Res. Soc. Symp. Proc.*, vol. 783 (2004); pp. B3.5.1-B3.5.6.

Safari Ardi, et al., "Dielectric properties of epoxy-barium titanate-carbon black composites", *Plastics, Rubber and Composites Processing and Applications*, vol. 24 (1995); pp. 157-164.

Tuncer, et al., "Electrical Properties of Epoxy Resin Based Nano-Composites", *Nanotechnology*, vol. 18 (2007); pp. 1-6.

Wang, et al., "Interface Modification and Characterization in Linear Low-Density Polyethylene Highly Loaded with Aluminum Hydroxide", *Polymer Composites*, vol. 23, No. 5 (Oct. 2002); pp. 691-696.

Xu, et al., "Synthesis of addition liquid vinylsiloxane rubber", *He cheng xiang giao gong ye (China Synthetic Rubber Industry)*, vol. 25, No. 5 (2002); pp. 286-288.

Yang, et al., "Influence of Surface Modifier and Silicone Oil on the Mechanical Properties of HDPE/A1(OH)_3 Composite", ISSN:1001-3539.0.2001-03-013, Gongcheng Suliao Yingyong, 29(3) (2001); 1 pg.

Zhang, et al., "Effect of Silicone Oil on the Mechanical Properties of Highly Filled HDPE Composites", *Polymers & Polymers Composites*, vol. 8, No. 7 (2000); pp. 471-476.

Zhu, et al., "Effects of Silicone Oil and Polymeric Modifiers on the Mechanical Properties of Highly Filled LLDPE", *Journal of Applied Polymer Science*, vol. 83 (2002); pp. 121-128.

International Search Report for Appl. No. PCT/US2018/015141, dated Jun. 20, 2018, 3 pp.

Search Report for CN Appl. No. 201880008730.2, dated Apr. 14, 2020, 2 pp.

* cited by examiner

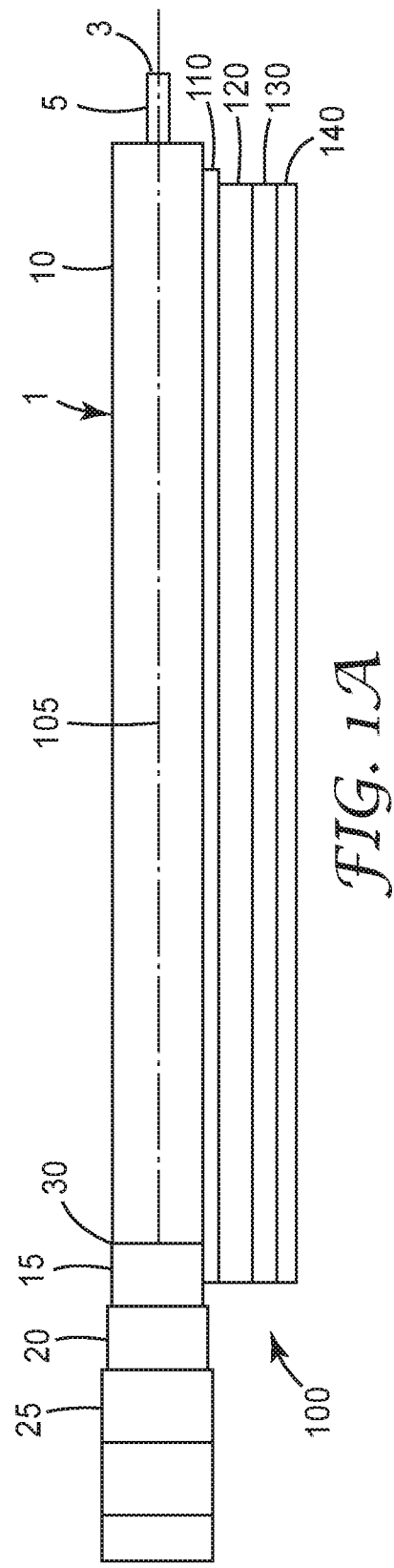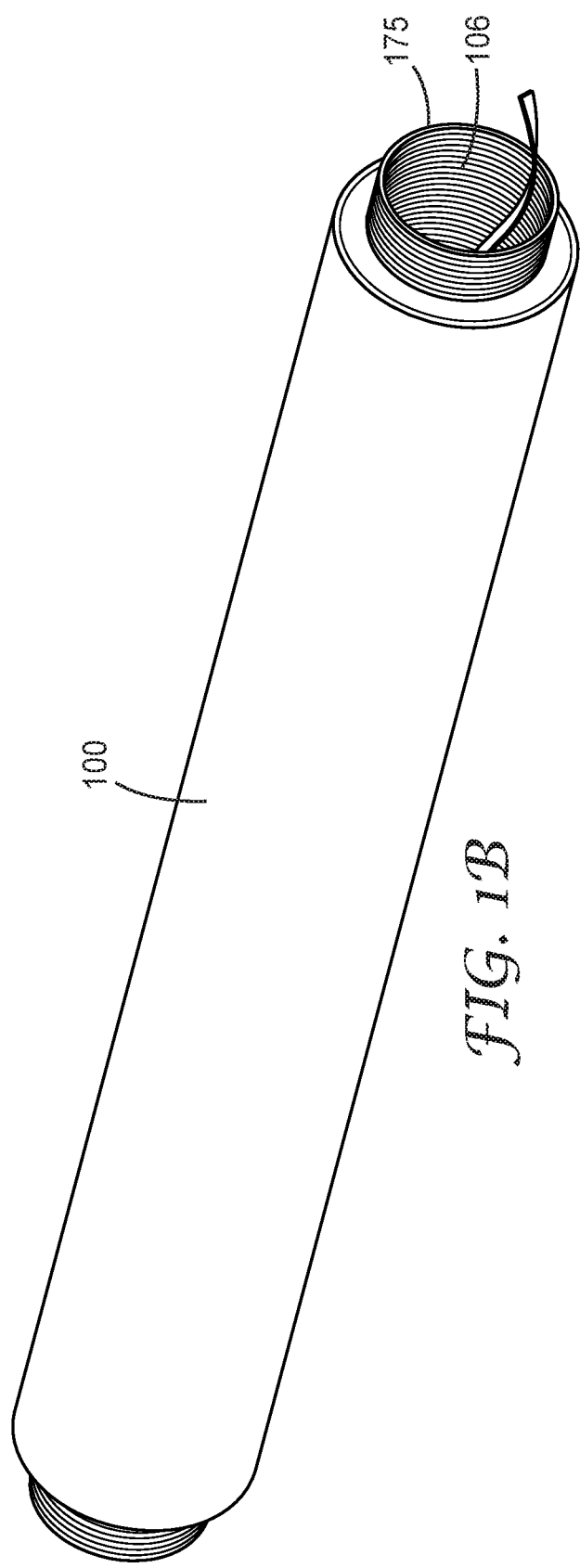

MULTILAYER STRESS CONTROL ARTICLE AND DRY TERMINATION FOR MEDIUM AND HIGH VOLTAGE CABLE APPLICATIONS

BACKGROUND

Cable accessories, such as cable splices (or joints) and terminations, are used in a wide variety of medium and high voltage electrical applications, with "medium voltage" representing voltage levels of at least 5 kV Um (where Um is the maximum system voltage) and "high voltage" representing voltage levels of at least 72.5 kV Um. High-voltage cables normally comprise a ground layer covering the cable insulation around the central conductor. The ground layer is often semiconductive or conductive, and is electrically connected to ground potential at some distance from the terminated cable end. Where a cable is to be terminated or joined with another cable, the insulation is normally cut back to expose the central conductor, and the ground layer is cut back further so that its edge is located at a distance from the end of the insulation. The electric field lines between the central conductor and the ground layer concentrates at the edge of the ground layer close to the terminated cable end. On the one hand, a greater distance between the exposed part of the central conductor and the edge of ground layer reduces the risk of electrical breakdown in the strong electric field between the central conductor and the edge of the ground layer. On the other hand, that distance should be kept to a minimum in order to keep the size of a termination or joint small so that their cost is lower and their installation is easier.

A termination or joint of a high-voltage cable must manage the strong electrical field between the central conductor and the edge of the ground layer at the end portion of the cable in order to avoid high electric "stress", i.e. negative effects caused by partial discharges, which may result in long-term electrical breakdown or electrical erosion, and interface discharges. These discharges are caused by the strong electric field on the materials of the cable and those of the termination or joint. In particular, it is desirable to avoid an extreme concentration of the electric field lines at the edge of the ground layer, while keeping the physical size of the entire termination or joint within reasonable limits.

Different field control or stress control approaches have been taken to avoid concentration of the electric field, like resistive stress control, refractive stress control, capacitive stress control or geometric stress control. Traditionally, many cable termination devices or joint devices had stress cones, which provided a conductive ground layer on the outer surface of a cone-shaped element.

In particular, terminations for such applications have traditionally utilized wet or oil filled devices, with a conductive or semi-conductive geometric stress cone to grade the electric stress and with a dielectric oil provided for insulation. These wet terminations can be complicated and can develop leaks over time, leading to failure of the device.

Alternatively, dry terminations have been used with a similar geometric stress control and a polymeric insulation. These dry type terminations typically require longer cable cut backs and can be difficult to install in a push-on application. Another type of termination is a dry GIS type or plug-in termination. These GIS terminations can be complicated to install and can cost much more than a traditional termination.

It is desirable to improve the stress control properties of cable terminations and joints in order to reduce the risk of electrical breakdown and damage to the cables or to the terminations or joints. In particular, it is desirable to provide stress control means that provide reliable stress control at higher voltages, without requiring more space. The present invention addresses these needs.

SUMMARY OF THE INVENTION

In a first aspect of the invention, a tubular stress control article having an axial bore with a length comprises a first and innermost layer formed from an electrical stress control composition having a filler material comprising nanosilica-modified inorganic particles and a discontinuous arrangement of conductive material dispersed in an elastomeric material. At least a portion of the conductive material is in durable electrical contact with the inorganic particles. The article further comprises a second layer disposed on the first layer, the second layer comprising an electrical insulation material. The article also comprises a third layer disposed on the second layer, the third layer comprising an elastomeric stress control material. The article further comprises a fourth layer disposed on the third layer, the fourth layer comprising a track-resistant elastomeric material. Each of the first, second, third, and fourth layers are substantially continuous along the length of the axial bore.

In another aspect, a cable accessory for a medium or high voltage cable having a conductive core, a cable insulation material radially surrounding the core and a cable shield layer surrounding the cable insulation material comprises a tubular stress control body. The tubular stress control body comprises an innermost or first layer formed from an electrical stress control composition having a filler material comprising nanosilica-modified inorganic particles and a discontinuous arrangement of conductive material dispersed in an elastomeric material, wherein at least a portion of the conductive material is in durable electrical contact with the inorganic particles. The tubular stress control body also comprises a second layer disposed on the first layer, the second layer comprising an electrical insulation material. The tubular stress control body also comprises a third layer disposed on the second layer, the third layer comprising an elastomeric stress control material that is electrically insulated from the cable shield layer. The tubular stress control body further comprises a fourth layer disposed on the third layer, the fourth layer comprising a track-resistant elastomeric material. Each of the first, second, third, and fourth layers are substantially continuous along the length of the axial bore.

As used in this description:

"electrical contact" between a conductive material and an inorganic particle means that a portion of the conductive material is touching, or is in sufficient physical proximity to, the inorganic particle so that a charge can travel between the conductive material and the inorganic particle thereby allowing current to flow directly or by forming an Ohmic contact hopping or tunneling effect under an applied voltage field of less than the breakdown voltage of the polymeric material;

"durable electrical contact" means that the electrical contact is not substantially altered by mixing and shearing forces encountered during composition processing steps; and "percolation threshold" means the critical fraction of lattice points that must be filled to first create an infinitely continuous conductive path.

The above summary of the present invention is not intended to describe each illustrated embodiment or every

BRIEF DESCRIPTION OF THE DRAWINGS

The invention will be described hereinafter in part by reference to non-limiting examples thereof and with reference to the drawings, in which:

FIG. 1A is a schematic axial longitudinal partial view of a multi-layer stress control article according to a first aspect of the invention.

FIG. 1B is an isometric view of an inner portion of the multi-layer stress control article in an expanded state prior to assembly.

DETAILED DESCRIPTION OF EMBODIMENTS

In the following description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the invention are directed to an article, in particular an electrical stress control article. The electrical stress control article comprises an elastomeric, multilayer body that includes at least one layer, a so-called High-K layer as explained below, that is formed from an electrical stress control composition having a filler material comprising nanosilica-modified inorganic particles and a discontinuous arrangement of conductive material dispersed in an elastomeric material, where at least a portion of the conductive material is in durable electrical contact with the inorganic particles. The elastomeric body can take the form of a "cold shrink" article, where cold shrink refers to the capability of an article (or portion of an article) to shrink from an expanded state toward a relaxed, or a partially expanded, state at room temperature conditions (e.g., about 20 C-25 C) and in the absence of heating. The electrical stress control article can be utilized as a termination or splice (or other type of cable accessory) for medium and high voltage applications. In addition, the electrical stress control article can provide a "dry" type termination or cable accessory, where elastomeric materials of the stress control article provide the required electrical insulation without addition of insulating oils or gels.

Figure 1C:
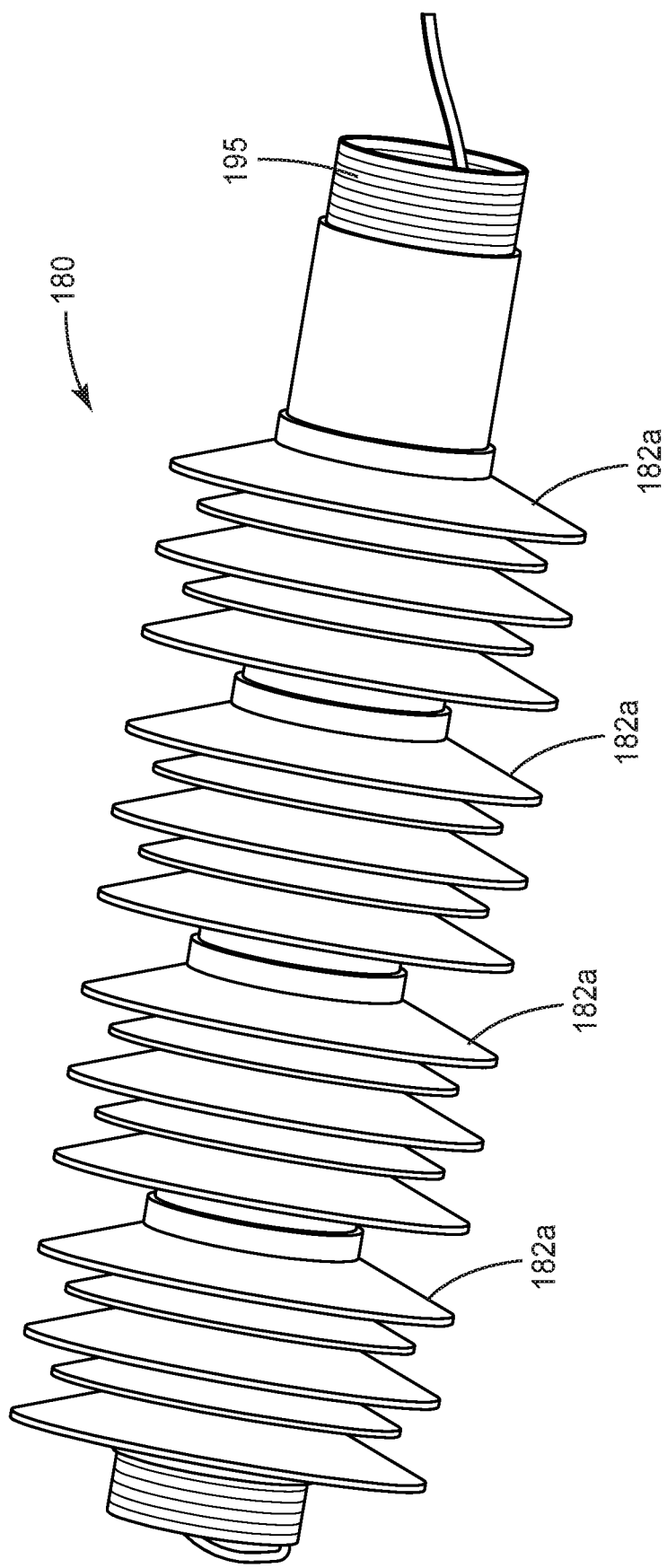
FIG. 1C is a side isometric view of an outer portion of the multi-layer stress control article with outer sheds in an expanded state prior to assembly.

FIG. 1A shows a first embodiment, a schematic axial longitudinal partial view of a multi-layer stress control article 100 disposed on a power cable 1. FIG. 1B shows the multi-layer stress control article 100 in an expanded state, about a removable support core 175. FIG. 1C shows multi-layer stress control article 100 with a plurality of shed (or skirt) modules installed thereon to increase flashover and creepage distance for high voltage applications. The construction of the multi-layer stress control article 100 will be described further below.

As mentioned, stress control article 100 is designed to conform around a prepared power cable, such as power cable 1. In general, the stress control material compositions described herein are particularly suitable for use in stress control elements or devices such as high voltage cable accessories, wherein the nonlinear properties of the compositions are useful. Dielectric stress control devices can be manufactured which are designed with respect to their dielectric properties and their geometric configurations in accordance with desirable modifications of an electric field present at the respective site of application. Particularly useful is a dielectric stress control device or element which comprises a shaped body, preferably a sleeve, which can be placed onto an end of a cable insulation and/or shield. Stress control devices or elements having other geometric configurations may be useful to prevent unacceptably high local field concentrations, for example in break elbows, transition or throughgoing connections, feed throughs and branchings of high tension cables.

In at least one embodiment, the composition of the stress control article 100 has elastomeric properties. This feature allows cold-shrink dielectric stress control devices to be manufactured which are suited for different dimensions or sizes of electrical structural components. For example in the case of sleeves, some may have sufficient resilience to be applicable with cable insulations and/or dimensions of various thicknesses.

The electrical stress control device 100 includes an axial bore 106 (see e.g., FIG. 1B), into which the end of a cable can be inserted. The diameter of the bore may be chosen such that it is large enough to allow insertion of the end portion of the cable, and such that it allows a tight fit between stress control device and the end portion of the cable, so that the stress control device is in a well-defined radial position relative to the cable. However, the bore may have a larger diameter than the end portion of the cable, and spacing means may be used, e.g. slipped over the cable, to allow the stress control device to be in a well-defined radial position relative to the cable. The bore may have a cylindrical shape, and it may extend from one end of the stress control device to another end of the stress control device.

As shown in FIG. 1A, the stress control device 100 includes multiple layers 110, 120, 130, and 140 that are arranged concentrically around the bore and concentrically with each other. At least one of the layers of the device is a stress control layer. A stress control layer may be a conductive or semiconductive tube or a conductive or semiconductive painted layer or a conductive or semiconductive extruded or a conductive or semiconductive co-extruded layer. A stress control layer may, for example, comprise an elastomer like, for example silicone, natural rubber or ethylene propylene diene monomer. A stress control layer may comprise particulate carbon matter to provide electrical conductivity.

In another aspect of the invention, at least one stress control layer can be adapted to be put on ground potential. A grounded stress control layer may provide for a further reduced risk of electrical breakdown between a central conductor and a ground layer of a cable with which the stress control device is used, because a grounded stress control layer prevents concentration of the electrical field at the edge of the ground layer effectively. A stress control layer may, for example, be adapted to be put on ground potential by comprising an externally accessible section, over which a conductive tape can be wound. The other end of the tape may be in electrical contact with a grounded shielding braid of a termination device or of a joint, in which the stress control device may be comprised. For example, a first stress control layer can be placed in contact and overlap the shield layer of the power cable, and further contact can be established by wrapping conductive tape or a metal braid over the edge of the stress control layer and also over the shield layer.

In another aspect of the invention, at least one of the stress control layers is adapted to be put on floating potential. Putting one of the stress control layers on floating potential may reduce the risk of electrical breakdown in parts of the cable that are not in direct vicinity of the edge of the ground layer. A stress control layer may, for example, be adapted to be put on floating potential by embedding it in electrically non-conductive material or by winding an electrically non-conductive film or tape around it.

In more detail, referring to FIG. 1A, the stress control article 100 comprises a first, or innermost, layer 110 formed from an electrical stress control composition that is described in further detail below. A second layer 120 comprising an electrical insulation material is disposed concentrically on the first layer 110. The electrical insulation material 120 can comprise a conventional insulation material, such as a dielectric material. The article also comprises a third layer 130 disposed on the second layer 120, the third layer 130 comprising an elastomeric stress control material. In a preferred aspect, layer 130 is electrically insulated from the cable shield, thereby making it at floating potential compared to a ground layer, as described in further detail below. In another preferred aspect, layer 130 can comprise a material having the same composition as layer 110. The article 100 further comprises a fourth layer 140 disposed on the third layer 130, the fourth layer 140 comprising a track-resistant elastomeric material. In addition, as shown in FIG. 1C, one or more shed modules (four shed modules 182a-182d are shown in the figure) can be provided as part of layer 140 or they can be provided on a separate core material 195 to be later disposed on layer 140. The shed modules 182a-182d include a plurality of sheds or skirts that can increase flashover and creepage distance and improve impulse performance. The size and number of sheds can be varied based on a particular application or voltage class.

In addition, each of the layers 110, 120, 130, 140 is substantially continuous along the length of the axial bore 106 and extends along the full length of the prepared cable portion (see e.g., axis 105).

Briefly, power cable 1 can comprise a conventional medium or high-voltage cable. Some radial dimensions are exaggerated for clarity of the Figure. Cable 1 comprises a high-voltage conductor 5 or central conductor 5, which conducts currents at a medium or high voltage, located in the center of the cable 1. The central conductor 5 can have a standard construction, such as metal conductor strands surrounded by a semi-conductive strand shield. An end 3 of the cable 1 is located where the central conductor 5 ends. An insulation layer 10 is concentrically arranged around the central conductor 5. A semiconductive or conductive shielding layer 15 is arranged concentrically around the insulation layer 10. A ground layer 20 is connected to ground potential at a location further away from the end 3 of the cable 1, this location is not shown in FIG. 1. The outermost layer of cable 1 is the non-conductive cable jacket 25 or cable sheath 25.

The cable 1 can be prepared for termination or for a joint/splice with a second cable (not shown). This preparation involves cutting back parts of the sheath 25, parts of the metallic ground layer 20, parts of the shield layer 15, and parts of the insulation layer 10, so that the central conductor 5 is exposed and can be fixed to a termination or a connector (not shown). The ground layer 15 has been partly removed so that it extends, in an axial direction of the cable up to an edge 30. An edge 30 of the shield layer 15 is located at a sufficient distance from the exposed central conductor 5, so that, when the cable is in operation, no risk of electrical breakdown or discharge between the shield layer 15 and the central conductor 5 exists. The metallic ground layer 20, in turn, has been removed up to a point sufficiently far from the edge 30 of the shield layer 15, so that the shield layer 15 can be electrically contacted close to the edge 30.

The shield layer 15 can include a semiconductive material on the outer surface of the insulation layer 10. In this embodiment, the semiconductive material can be a cross-linked polyethylene or XLPE, loaded with carbon-particulate matter. The shield layer 15 is co-extruded with the insulation layer 10 of the cable 1.

The metallic ground layer 20 may also comprise a metal foil. The metal foil can be wound around the shield layer 15. The ground layer 20 may, for example, comprise an aluminum foil, e.g. a wound aluminum foil.

In more detail, layer 110, and optionally layer 130, can each comprise a so-called High-K material, which provides a balance of dielectric properties (permittivity or dielectric constant, conductivity, loss tangent, and dielectric strength) for control of the electric field. In one aspect, layer 110 (and optionally layer 130) comprises a filler material that includes inorganic particles on which conductive material, such as conductive particles, is affixed in durable electrical contact. The conductive material is applied to the inorganic particles in a manner that provides a sufficient electrical, e.g., static, or chemical, attraction between the inorganic particles and conductive material to inhibit the conductive material from separating from the inorganic particles during handling and subsequent material processing steps. The inorganic particles with which the conductive material is affixed in durable electrical contact may then be added to a polymeric material to form a dielectric composition. These compositions have significantly better electrical properties than traditional carbon filled polymers.

Figure 2:
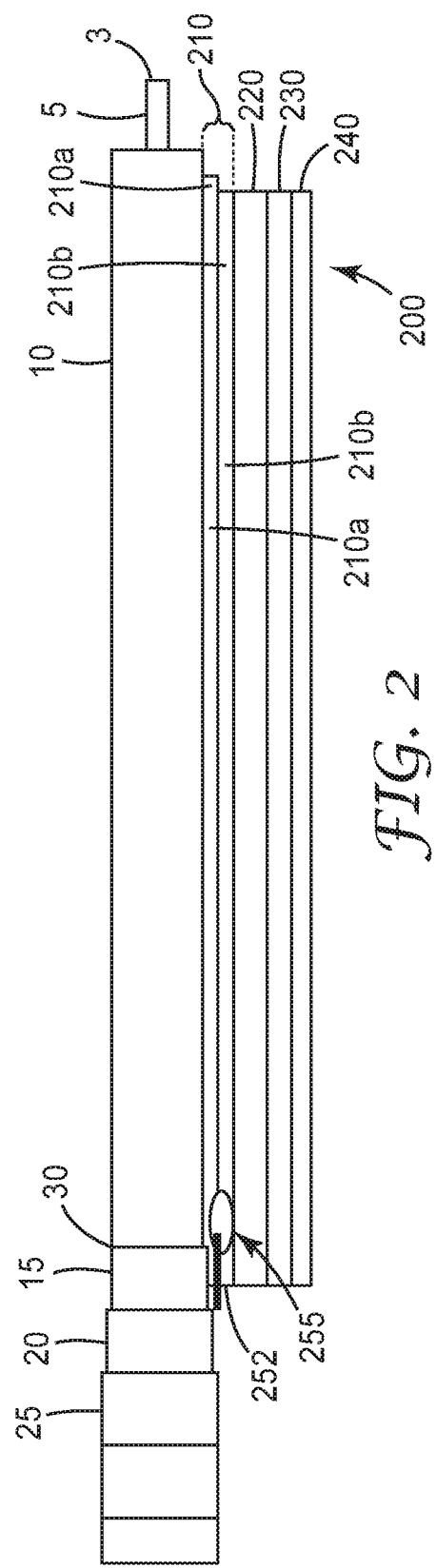
FIG. 2 is a schematic axial longitudinal partial view of another embodiment of a multi-layer stress control article.

In some embodiments, the High-K layer compositions were first prepared by affixing in durable electrical contact the surface of barium titanate (an inorganic ferroelectric ceramic) particles with a highly structured form of conductive carbon powder that has high void volume and high conductivity, such as that available under the trade designation ENSACO 250 G, from TimCal Graphite & Carbon Corp., Bodio, Switzerland, and having a nominal particle diameter of 40 nm, and then dispersed in a silicone polymer (a polymer having an SiO backbone) matrix as shown in FIG. 2. The resulting elastomeric compositions after curing had a high dielectric constant (>20), low loss (<0.04) and high dielectric breakdown strength (>140 V/mil) and unexpectedly exhibited field dependent permittivity (non-linearity). These non-conducting (low loss) compositions exhibited the unique non-linear property of a gradually increasing dielectric constant with an increasing electric field. In some preferred embodiments, the barium titanate volume loading in the composition is greater than 20 volume percent and the barium titanate to carbon percent volume ratio is between about 6 and about 12. However, the elongation to break for these compositions is less than about 150%, so they are most suitable for applications that do not require superior mechanical properties.

In other embodiment of the invention, good mechanical properties as well as the unique non-linear electrical property are obtained. In these embodiments, the composition includes an elastomeric composite comprised of (a) a high dielectric constant filler such as nanosilica (i.e., nanometer sized silica particles)-modified barium titanate (25 v %), (b) carbon powder (3.0 v %) and (c) silicone oil (an oil comprising oligomers having an SiO backbone) (10 v %) in a silicone rubber matrix. The unique combination of nanosilica-modified barium titanate together with the silicone oil additive substantially enhanced the filler (barium titanate) dispersion and reinforcement with silicone matrix. As a result, this composition showed improved mechanical (elongation to break>300%, tensile strength 372-520 psi) and electrical (dielectric constant 23-30, dissipation factor<0.05 and breakdown strength 180-210 V/mil) properties, and had a preferred conductivity profile that provided an improved impulse performance. These improved properties make at least some embodiments of the composition and articles of the invention especially useful for stress control in high voltage cable accessories that require superior mechanical properties, such as cold-shrink applications.

Some of the improved properties were achieved by improving filler dispersion and reinforcement with silicone rubber by using a unique combination of nanosilica-modified filler (barium titanate) and silicone oil additive.

Suitable materials for the inorganic particles of the present invention include, for example, $BaTiO_3$ particles, $BaSrTiO_3$ particles, $CaCu3Ti_4O_{12}$ particles (including, e.g., particles calcined or sintered at a temperature of 800° C.), and $SrTiO_3$ particles, or mixtures thereof. Such particles may be pure or may modified, such as by doping, or by adding other ingredients. Preferably the inorganic particles have a relative dielectric constant of greater than 80. The inorganic particles may have any suitable shape such as spheres, plates, platelets, cubes, needles, oblate, spheroids, pyramids, prisms, flakes, rods, fibers, chips, whiskers, etc. or mixtures thereof. A suitable size, e.g., diameter, for the inorganic particles is a lower limit of about 0.7 μm to about 1.0 μm, and an upper limit of about 0.8 μm to about 2.1 μm.

The mechanical properties of the High-K layer compositions can be enhanced by modifying the inorganic particles with nano-silica. For example, the combination of nano-silica-modified barium titanate with silicone oil can substantially enhance the barium titanate dispersion and reinforcement in the matrix of silicone polymer material. The barium titanate can be modified with nanosilica by mixing the barium titanate with hydrophobically-modified nanoparticles in toluene and evaporating the toluene. The dried material can be shaken with ceramic marbles to reduce particle agglomeration. The nanosilica-modified barium titanate can then be ground together with carbon powder. A suitable weight % of nano-silica particles to inorganic particles is about 0.5 to about 1.0, preferably about 0.75. Suitable sizes of the nano-silica particles are about 1 to about 50 nm, preferably about 5 nm. Typically, the inorganic particles on which the nano-silica particles are applied have a diameter of about 0.8 μm to about 2.1 μm.

Suitable materials for the conductive material include, for example, carbon blacks, carbon nanotubes, insulating particles having conductive coatings, metals and metallic powders, for example aluminum, gold, silver, chromium, copper, palladium, nickel and alloys thereof. The conductive material may be in any suitable form such as clusters, e.g., clusters of carbon particles, individual particles, and vaporized solids that may be coated or deposited on the inorganic particles. If the conductive material is particulate, it may have any suitable shape such as spheres, plates, platelets, cubes, needles, oblate, spheroids, pyramids, prisms, flakes, rods, fibers, chips, whiskers, etc. or mixtures thereof.

The application, or affixation, of the conductive material to the inorganic particles can be performed in any suitable manner, such as, for example, grinding, ball milling, impact-coating, and magnetically-assisted impact coating the conductive material and inorganic particles together, coating, solvent-coating, vapor-depositing, and liquid dispersing the conductive material on the inorganic particles, or using any other known suitable method such that the conductive material forms a discontinuous arrangement wherein at least a portion of the conductive material is in durable electrical contact with the inorganic particles. The conductive materials may be applied to a small or large area of the surface of the inorganic particles. Determination of the appropriate amount of conductive materials applied to the inorganic particles depends on various factors such as the combination of materials in the composition, e.g., conductive material, inorganic particle, polymer, additives, and the intended use of the material.

The basic polymeric material may be selected from a large range of polymers. Blends of two or more polymers may be desirable in some cases and the polymers selected will depend at least to a certain extent on the purpose to which the material is to be put. Examples of polymers suitable either alone or in blends include elastomeric materials, for example silicone or EPDM; thermoplastic polymers, for example polyethylene or polypropylene; adhesives, for example those based on ethylene-vinyl-acetate; thermoplastic elastomers; gels; thermosetting materials, for example epoxy resins; or a combination of such materials, including co-polymers, for example a combination of polyisobutylene and amorphous polypropylene, epichlorohydrin polymers, fluoroelastomer polymers, and blends of epichlorohydrin and fluoroelastomer polymers.

The compositions may also comprise other well-known additives for those materials, for example to improve their processability and/or suitability for particular applications. In the latter respect, for example, materials for use as power cable accessories may need to withstand outdoor environmental conditions. Suitable additives may thus include processing agents, stabilizers, antioxidants and plasticizers, for example oil, such as silicone oil. Compositions can be made by mixing the inorganic particles on which conductive material is affixed with the polymer and any desired additives. In many embodiments of the compositions, conductive material, which is the same or different as the conductive material coated on the inorganic particles, will be dispersed in the polymeric material.

In another aspect, the composition includes the discontinuous arrangement of conductive material on the inorganic particles in electrical contact with the inorganic particles and further includes conductive material dispersed in the polymeric material. The total amount of conductive material in the composition can be between about 40 and about 70 vol % of the amount of conductive material needed to attain the composition's percolation threshold.

In another aspect, the composition can have a relative dielectric constant greater than about 10, preferably greater than about 15, preferably greater than about 18 and a dielectric loss of less than about 0.1, preferably less than about 0.12, and more preferably less than about 0.05.

In another aspect, the composition can have a dielectric breakdown strength greater than about 150 Volts/millimeter (V/mm), preferably greater than about 4 kiloVolts/millimeter (kV/mm), preferably greater than about 7.2 kV/mm.

In another aspect, the composition can have a relative dielectric constant value that changes in a non-linear manner upon a change in applied voltage.

In another aspect, the polymeric material can comprise an elastomeric material and have an elongation at break of greater than about 150%, preferably greater than about 300% and a permanent set (as per ASTM D 412-06a) of less than about 25, preferably less than about 20, more preferably less than about 10.

In another aspect, the composition can have a modulus of elasticity of greater than about 150 pounds per square inch, preferably greater than about 230 pounds per square inch, and more preferably greater than about 300 pounds per square inch.

As mentioned above, layer 110 is substantially continuous along the length of the axial bore 106. In one aspect, layer 110 extends along the full length of the prepared cable portion (see e.g., axis 105). This longer length can help improve impulse performance.

As mentioned previously, layer 110 and optionally layer 130 can comprise any of the aforementioned High-K material compositions. In an alternative aspect, the third layer 130 can comprise a different elastomeric stress control material, having a different filler, a different amount of filler, or a different elastomer.

In another aspect of the invention, layer 110 (and optionally layer 130) can comprise a layer that is up to about 70% (wt.) loaded, whereby "70% (wt.)" refers to the specific weight percent of the total mass of the composition that is the stress control filler. The total amount of filler would typically be a higher weight percent as the base elastomer would already contain some re-enforcing filler (e.g., fumed silica). As observed by the investigators, a weight loading of up to about 70% can help balance factors such as stress control, physical properties, breakdown strength, and dielectric heating. Samples having higher weight loading (e.g., 72.5% or more) were observed to result in splitting, which can lead to failure under alternating current at high voltage levels.

In another aspect, a thickness of first layer 110 can be from about 0.05 inches to about 0.4 inches. In a preferred aspect, this thickness is consistent along the entire length of the axial bore. A layer of greater than 0.2 inches thickness can improve PD and AC performance.

In another aspect, a thickness of the second layer 120 can be from about 0.05 inches to about 2 inches. In a preferred aspect, this thickness is consistent along the entire length of the axial bore.

In another aspect, a thickness of the third layer 130 can be from about 0.05 inches to about 0.4 inches. In a preferred aspect, this thickness is consistent along the entire length of the axial bore.

In another aspect, a thickness of the fourth layer 140 can be from about 0.05 inches to about 0.30 inches. In a preferred aspect, this thickness is consistent along the entire length of the axial bore.

In another aspect, the overall axial length of the stress control device body can be up to about 40 inches for voltage levels up to and including 123 kV Um.

In another aspect, the stress control article 100 can further include an interfacial dielectric coating applied to one or more of the multiple layers described above. The interfacial dielectric coating can comprise a grease or similar material and can help reduce interfacial breakdown. The type of grease utilized can depend on the layer composition. For example, a polyfluoroether oil can be used to coat a silicone material, as it is not absorbed into the polymer. Other suitable materials, depending on the application, include fluorosilicone oil-based grease and PDMS oil-based grease.

In another aspect, the overall axial length of the stress control device body can be up to about 52 inches for voltage levels up to and including 145 kV Um. This overall length represents about a 25% reduction in length from conventional push on devices.

FIG. 2 shows another embodiment, a schematic axial longitudinal partial view of a multi-layer stress control article 200 disposed on a power cable 1, which can have a similar cable design as described above. The stress control device 200 includes multiple layers 210, 220, 230, and 240 that are arranged concentrically around the bore and concentrically with each other. At least one of the layers comprises a stress control layer that can comprise the same or similar materials as described above.

In further detail, the stress control article 200 comprises a first, or innermost, layer 210 formed from multiple layers of an electrical stress control composition, such as from those described above. As shown in FIG. 2, layer 210 comprises a dual layer structure, having two distinct layers, such as layer 210a and layer 210b. Each of layers 210a and 210 b can comprise a High-K material such as described in detail previously. Layers 210a and 210b can have the same composition or different compositions. This type of multiple High-K layer construction can be useful for higher voltage applications, such as at 145 kV Um.

In one aspect, a separate semiconductive or conductive shield layer 252 is circumferentially disposed between layers 210a and 210b at a position at or near edge 30 of the power cable 1. The shield layer 252 has an axial length that is much shorter than the axial lengths of the High-K layers 210a, 210b. Layer 252 can act as an extension of the cable shield and can be electrically connected to ground potential and can help provide shielding in the event of any cable preparation errors.

In addition, stress control article 200 further includes a High-K mastic material 255 disposed at one axial end of the shield layer 252. This High-K mastic material 255 can comprise the same composition as the High-K materials described previously, but in an uncured form and can be applied to an end of shield layer 252 and applied completely around the shield layer. The High-K mastic 255 is similar in electrical properties as layers 210a, 210b and can help prevent impulse breakdown of the interface between layers 210a and 210b at the shield layer 252. The high-K mastic 255 can generate more heat, but can also improve PD and AC performance. In an alternative configuration, a molded design could be employed.

In addition, stress control device 200 includes a layer 220 comprising an electrical insulation material that is disposed concentrically on the layer 210. The electrical insulation material 220 can comprise a conventional insulation material.

Stress control article 200 also comprises a layer 230 disposed on the layer 220, the layer 230 comprising an elastomeric stress control material. In a preferred aspect, layer 230 is electrically insulated from the cable shield, thereby making it at floating potential compared to the ground layer, as described in further detail herein. In another preferred aspect, layer 230 can comprise a material having the same composition as at least one of the layers of innermost layer 210.

The article 200 further comprises a layer 240 disposed on the layer 230, the layer 240 comprising a track-resistant elastomeric material.

In addition, each of the layers 210, 220, 230, 240 is substantially continuous along the length of the axial bore and, in some embodiments, extends along the full length of the prepared cable portion.

In another aspect, the stress control article 200 can further include an interfacial dielectric coating applied to one or more of the multiple layers described above. The interfacial dielectric coating can comprise a grease or similar material and can help reduce interfacial breakdown. As mentioned above, the type of grease utilized can depend on the layer composition. For example, a polyfluoroether oil can be used to coat a silicone material, as it is not absorbed into the polymer. Other suitable materials, depending on the application, include fluorosilicone oil-based grease and PDMS oil-based grease.

Embodiments of the invention provide, in some aspects, a high-voltage termination device or high-voltage cable joint or splice, which comprises an electrical stress control device as described above. A high-voltage termination device or cable joint, which comprises an electrical stress control device according to the invention, may exhibit a reduced risk of electrical breakdown between a central conductor and a ground layer of a cable with which the high-voltage termination device or cable joint is used, yet requiring reduced space.

Thus, embodiments of the invention provide a multilayer and a coaxial stress control device or cable accessory, such as a termination or splice. The stress control material and design allows the cable accessory to be more compact and facilitates straightforward manufacturability and installation as compared to conventional dry type cable accessories for voltages above Um=72.5 kV. By using cold shrink technology to apply the termination to the cable, installation is performed in a straightforward manner. The dry and compact features are enabled by using the High-K stress control materials described herein. In addition, the design provides for a device that includes a first stress control material in combination with a secondary stress control material, which is coaxial in position to the first stress control material and at a different (floating) potential.

Embodiments Section

The following is a list of exemplary embodiments of the present description.

Embodiment 1A is a tubular stress control article having an axial bore with a length, comprising a first layer formed from an electrical stress control composition having a filler material comprising nanosilica-modified inorganic particles and a discontinuous arrangement of conductive material dispersed in an elastomeric material, wherein at least a portion of the conductive material is in durable electrical contact with the inorganic particles; a second layer disposed on the first layer, the second layer comprising an electrical insulation material; a third layer disposed on the second layer, the third layer comprising an elastomeric stress control material; and a fourth layer disposed on the third layer, the fourth layer comprising a track-resistant elastomeric material, wherein each of the first, second, third, and fourth layers are substantially continuous along the length of the axial bore.

Embodiment 2A is the article of embodiment 1A, wherein the expandable body further comprises a removable core material disposed on an inner surface of the first layer to maintain the body in an expanded state until the core is removed.

Embodiment 3A is the article of any preceding embodiment, wherein the first layer comprises a dual-layer structure having a semiconductive or conductive material disposed between a portion of the dual-layer structure.

Embodiment 4A is the article of any preceding embodiment, further comprising a fifth layer disposed on an outer surface of the fourth layer and comprising a plurality of sheds.

Embodiment 5A is the article of any preceding embodiment, wherein the first layer is up to about 70% (wt.) loaded.

Embodiment 6A is the article of any preceding embodiment, wherein a thickness of the first layer is from about 0.05 inches to about 0.40 inches.

Embodiment 7A is the article of any preceding embodiment, wherein a thickness of the second layer is from about 0.05 inches to about 2 inches.

Embodiment 8A is the article of any preceding embodiment, wherein a thickness of the third layer is from about 0.05 inches to about 0.40 inches.

Embodiment 9A is the article of any preceding embodiment, wherein a thickness of the fourth layer is from about 0.05 inches to about 0.30 inches.

Embodiment 10A is the article of any preceding embodiment, wherein the body has an overall length of up to 40 inches.

Embodiment 11A is the article of any preceding embodiment, wherein the body has an overall length of up to 52 inches.

Embodiment 12A is the article of any preceding embodiment, wherein the first and third layers comprise the same material composition.

Embodiment 13A is the article of any preceding embodiment, further comprising a High-K mastic material disposed at one axial end of the semiconductive or conductive material.

Embodiment 1B is a cable accessory for a medium or high voltage cable having a conductive core, a cable insulation material radially surrounding the core and a cable shield layer surrounding the cable insulation material, the cable accessory comprising a tubular stress control body comprising a first layer formed from an electrical stress control composition having a filler material comprising nanosilica-modified inorganic particles and a discontinuous arrangement of conductive material dispersed in an elastomeric material, wherein at least a portion of the conductive material is in durable electrical contact with the inorganic particles; a second layer disposed on the first layer, the second layer comprising an electrical insulation material; a third layer disposed on the second layer, the third layer comprising an elastomeric stress control material that is electrically insulated from the cable shield layer; and a fourth layer disposed on the third layer, the fourth layer comprising a track-resistant elastomeric material, wherein each of the first, second, third, and fourth layers are substantially continuous along the length of the axial bore.

Embodiment 2B is the cable accessory of embodiment 1B, further comprising a removable core material disposed on an inner surface of the first layer to maintain the body in an expanded state over the power cable until the core is removed.

Embodiment 3B is the cable accessory of any previous cable accessory embodiment, wherein the first layer comprises a dual-layer structure, each of the dual layers being substantially continuous along the length of the axial bore, and further comprising a semiconductive or conductive material disposed between a portion of the dual-layer structure.

Embodiment 4B is the cable accessory of any previous cable accessory embodiment, further comprising a fifth layer disposed on an outer surface of the fourth layer and comprising a plurality of sheds.

Embodiment 5B is the cable accessory of any previous cable accessory embodiment, wherein the first layer is up to about 70% (wt.) loaded.

Embodiment 6B is the cable accessory of any previous cable accessory embodiment, wherein a thickness of the first layer is from about 0.05 inches to about 0.40 inches.

Embodiment 7B is the cable accessory of any previous cable accessory embodiment, wherein a thickness of the second layer is from about 0.05 inches to about 2 inches.

Embodiment 8B is the cable accessory of any previous cable accessory embodiment, wherein a thickness of the third layer is from about 0.05 inches to about 0.40 inches.

Embodiment 9B is the cable accessory of any previous cable accessory embodiment, wherein a thickness of the fourth layer is from about 0.05 inches to about 0.30 inches.

Embodiment 10B is the cable accessory of any previous cable accessory embodiment, wherein the stress control body has an overall length of up to 40 inches.

Embodiment 11B is the cable accessory of any previous cable accessory embodiment, wherein the stress control body has an overall length of up to 52 inches.

Embodiment 12B is the cable accessory of any previous cable accessory embodiment, wherein the first and third layers comprise the same material composition.

Embodiment 13B is the cable accessory of any previous cable accessory embodiment, wherein the semiconductive or conductive material has an axial length that is much shorter than the axial lengths of the dual layers, and further comprising a High-K mastic material disposed at one axial end of the semiconductive or conductive material.

Embodiment 14B is the cable accessory of any previous cable accessory embodiment, comprising a dry cable accessory.

Embodiment 15B is the cable accessory of any previous cable accessory embodiment, comprising one of a termination and a splice, wherein the first layer comprises a dual-layer structure having an electrode disposed therein.

Embodiment 16B is the cable accessory of any previous cable accessory embodiment, wherein the cable accessory operates at voltage levels of at least 72.5 kV.

Embodiment 17B is the cable accessory of any previous cable accessory embodiment, wherein the cable accessory operates at voltage levels of at least 123 kV.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

The invention claimed is:

1. A tubular stress control article having an axial bore with a length, comprising:
    a first layer formed from an electrical stress control composition having a filler material comprising nano-silica-modified inorganic particles and a discontinuous arrangement of conductive material dispersed in an elastomeric material, wherein at least a portion of the conductive material is in durable electrical contact with the inorganic particles;
    a second layer disposed on the first layer, the second layer comprising an electrical insulation material;
    a third layer disposed on the second layer, the third layer comprising an elastomeric stress control material; and
    a fourth layer disposed on the third layer, the fourth layer comprising a track-resistant elastomeric material,
    wherein each of the first, second, third, and fourth layers are substantially continuous along the length of the axial bore, and
    wherein the first layer comprises a dual-layer structure having a semiconductive or conductive material disposed between a portion of the dual-layer structure.

2. The article of claim 1, wherein the expandable body further comprises a removable core material disposed on an inner surface of the first layer to maintain the body in an expanded state until the core is removed.

3. The article of claim 1, further comprising a fifth layer disposed on an outer surface of the fourth layer and comprising a plurality of sheds.

4. The article of claim 1, wherein the first layer is up to about 70% (wt.) loaded.

5. The article of claim 1, wherein:
    a thickness of the first layer is from about 0.05 inches to about 0.40 inches,
    a thickness of the second layer is from about 0.05 inches to about 2 inches,
    a thickness of the third layer is from about 0.05 inches to about 0.40 inches, and
    a thickness of the fourth layer is from about 0.05 inches to about 0.30 inches.

6. The article of claim 1, wherein the body has an overall length of up to 40 inches.

7. The article of claim 1, wherein the first and third layers comprise the same material composition.

8. The article of claim 1, further comprising a High-K mastic material disposed at one axial end of the semiconductive or conductive material.

9. A cable accessory for a medium or high voltage cable having a conductive core, a cable insulation material radially surrounding the core and a cable shield layer surrounding the cable insulation material, the cable accessory comprising a tubular stress control body comprising:
    a first layer formed from an electrical stress control composition having a filler material comprising nano-silica-modified inorganic particles and a discontinuous arrangement of conductive material dispersed in an elastomeric material, wherein at least a portion of the conductive material is in durable electrical contact with the inorganic particles;
    a second layer disposed on the first layer, the second layer comprising an electrical insulation material;
    a third layer disposed on the second layer, the third layer comprising an elastomeric stress control material that is electrically insulated from the cable shield layer; and
    a fourth layer disposed on the third layer, the fourth layer comprising a track-resistant elastomeric material,
    wherein each of the first, second, third, and fourth layers are substantially continuous along the length of the axial bore,
    wherein the first layer comprises a dual-layer structure, each of the dual layers being substantially continuous along the length of the axial bore, and further comprising a semiconductive or conductive material disposed between a portion of the dual-layer structure.

10. The cable accessory of claim 9, further comprising a removable core material disposed on an inner surface of the first layer to maintain the body in an expanded state over the power cable until the core is removed.

11. The cable accessory of claim 9, further comprising a fifth layer disposed on an outer surface of the fourth layer and comprising a plurality of sheds.

12. The cable accessory of claim 9, wherein the first and third layers comprise the same material composition.

13. The cable accessory of claim 9, wherein the semiconductive or conductive material has an axial length that is much shorter than the axial lengths of the dual layers, and further comprising a High-K mastic material disposed at one axial end of the semiconductive or conductive material.

14. The cable accessory of claim 9 comprising a dry cable accessory.

15. The cable accessory of claim 9 comprising one of a termination and a splice, wherein the first layer comprises a dual-layer structure having an electrode disposed therein.

16. The cable accessory of claim 15, wherein the cable accessory operates at voltage levels of at least 72.5 kV.

17. The cable accessory of claim 16, wherein the cable accessory operates at voltage levels of at least 123 kV.

\* \* \* \* \*